This invention is concerned with the suppression and control of vegetative growth and is particularly directed to a composition for the suppression of the growth of plants and a method for controlling the growth of undesirable vegetation.

2,693,407

METHOD AND COMPOSITION FOR THE CONTROL OF UNDESIRABLE VEGETATION

Arthur W. Swezey, Garden Grove, Calif., assignor to The Dow Chemical Company, Midland, Mich., a corporation of Delaware No Drawing. Application November 23, 1951, Serial No. 257,936

13 Claims. (Cl. 71—2.3)

This invention is concerned with the suppression and control of vegetative growth and is particularly directed to a composition for the suppression of the growth of plants and a method for controlling the growth of undesirable vegetation.

The control of grasses, weeds and other vegetation is a matter of major concern not only to agriculturists, but also to industry. Thus, the problems of the farmer, rancher or orchardist in maintaining clean fence rows, orchard floor or barnyard, and irrigation ditch banks are equalled by those of utilities such as power companies and railroads on rights of way, yards and along power lines. Similarly, the petroleum industry struggles continually with the matter of vegetation control adjacent to pipe lines, oil wells, tank farms and yards. The maintenance of highways provides a further instance in which much time and effort are expended to keep vegetation under control.

The concept of chemical control of vegetation is of fairly recent origin. Beginning with the use of inorganic materials such as the chlorates, arsenites, borax and salt, this concept has progressed through phytotoxic petroleum products to the aryloxy-aliphatic acids and their salts and esters. The wide acceptance and practice of such control has brought into focus certain shortcomings of commonly recommended practice. Thus, many of the conventional materials, when applied to the aerial portions of vegetation, selectively control only one type of vegetation. The resulting partial denuding of the soil, sometimes encourages the invasion of non-susceptible species in the space so provided. Still other materials accomplish a top kill only, with the subsequent regrowth from the unaffected roots resulting in more severe infestation than existed prior to treatment. With other products, and particularly those inorganic materials heretofore proposed for soil treatment, hundreds or even thousands of pounds per acre may be required to accomplish even a transitory sterilization.

It is an object of the present invention to provide a novel composition for the suppression of the growth of vegetation. A further object is to provide a such composition of matter as a growth medium sterile to the growth of vegetation. An additional object is to supply a method for the control of growth of undesirable vegetation in soil or other growth media. Another object is to provide a method for suppressing the growth of germinative and germinant seeds in growth media. Still other objects will become evident from the following specification and claims.

In accordance with the present invention, it has been discovered that the trichloroacetates of the chloroaryloxyalkanols, having the formula

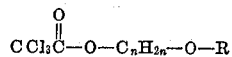

wherein $n$ represents one of the integers 2 and 3 and R represents a chloroaryl radical, are adapted to be applied to the aerial portions of plants and to be dispersed in soil or other growth media to suppress the growth of vegetation. They may also be employed for the control of the growth of germinative or germinant seeds in soil or other growth media.

The preferred embodiments of this invention are (1) a concentrate composition for the suppression of the growth of vegetation which comprises as an active toxic ingredient, a trichloroacetate of a chloroaryloxy alkanol as defined in the preceding paragraph, in admixture with at least one material selected from the group consisting of finely divided inert solids and surface active dispersing agents, and (2) a method for the control of the growth of vegetation which comprises contacting the foliage of vegetation with a growth inhibiting dosage of the same trichloroacetate toxicants.

The expression "growth media" is employed in the present specification and claims in its broadest sense to be inclusive of all conventional "soils," as defined in Webster's New International Dictionary, Second Edition, Unabridged, published in 1937 by G. and C. Merriam Company, Springfield, Massachusetts. Thus, the term refers to any substance or medium in which vegetative organisms may take root and grow, and is intended to include not only earth but also compost, manure, humus, muck, and sand and the like, adapted to support plant growth.

The expression "surface active dispersing agent" as herein employed, is intended to include all agents which are capable of acting at the interfacial surface between the acetate toxicant and water as the dispersion medium, so as to facilitate the dispersion of the toxicant in water. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, condensation products of alkylene oxide with phenols and organic acids, polyoxyethylene derivatives of sorbitan esters, mahogany soaps and the like.

The term "finely divided inert solids" as herein employed refers to materials which are incapable of facilitating the dispersion of the water-immiscible acetate toxicants in water as the dispersion medium and is intended to include finely divided materials such as chalk, talc, gypsum and the like.

When operating in accordance with the present invention, the toxicants may be compounded with any of the finely divided inert solids by grinding, mixing or by wetting the carrier with a solution of toxicant in volatile organic solvents, to form dust compositions. Similarly, dust compositions containing the acetate toxicants may be compounded from various of the solid surface active dispersing agents, such as bentonite, fuller's earth, attapulgite and other clays. Depending upon the proportions of ingredients, these dust compositions may be employed as concentrates and subsequently diluted with additional solid surface active dispersing agent or with talc, chalk, gypsum, and the like to obtain the desired amount of active ingredient in a composition adapted to be applied for the suppression of plant growth. Also, such concentrate dust compositions may be dispersed in water with or without the aid of additional dispersing agent, to form spray mixtures. The dust concentrates commonly contain from 5 to 95 percent by weight of toxic ingredient.

Further, the acetate compounds or dust concentrate compositions containing such toxicants may be incorporated in intimate mixture with other surface active dispersing agents such as ionic and non-ionic emulsifying agents to form spray concentrates. Such concentrates are readily dispersible in liquid carriers to form sprays containing the toxicant in any desired amount. The toxicant preferably constitutes from about 5 to 95 percent by weight of the concentrate. The choice of dispersing agent and amount thereof employed are determined by the ability of the agent to facilitate the dispersion of the concentrate in the liquid carrier to produce the desired spray composition.

Similarly, the acetate toxicants may be compounded with a suitable water-immiscible organic liquid and a surface active dispersing agent to produce emulsifiable liquid concentrates which may be further diluted with water and oil to prepare spray mixtures in the form of oil and water emulsions. Preferred dispersing agents to be employed in these compositions are oil soluble and include the non-ionic emulsifiers such as the condensation products of alkylene oxide with phenols and organic acids, polyoxyethylene derivatives of sorbitan esters, complex ether alcohols and the like. However, oil soluble ionic emulsifying agents such as mahogany soaps may also be used. Suitable organic liquids to be employed in the compositions include petroleum oils and distillates, toluene, liquid halo hydrocarbons and synthetic organic oils. The toxicant in the emulsifiable concentrate compositions preferably constitutes from about 5 to 95 percent by weight of the composition.

A further preferred composition of the invention comprises the acetate toxicants incorporated in intimate mixture with soil or other growth media. In preparing such compositions, a sterilizing amount of the toxicant is intimately dispersed in any suitable fashion through the growth media and in close proximity to or in contact with any seeds, seedlings or plant parts which may be present therein. If desired, the unmodified toxicant may be used, but preferably a dust or spray composition or solution of the acetate compound is mechanically mixed with the soil. Alternatively, the acetate toxicants or compositions containing them may be applied to the surface of the soil and thereafter dragged or disced into the soil to the desired depth.

Regardless of the manner in which the sterile growth media compositions are prepared, it is essential that the acetate toxicant be intimately dispersed so as to contact plants and germinative seeds already present therein, or seeds which may be introduced into or onto the treated areas. This is readily accomplished with soil, humus, muck, and sand for use in greenhouse operations by spraying or dusting the growth media with a composition containing the toxicant while the media are tumbled or mixed. Growth media so treated may be fallowed under conditions of moisture, light and temperature encouraging decomposition or dissipation of the sterilent, to obtain plant growth media free of germinative seeds and adapted to be returned to productive cultural practices.

Similar treating operations may be carried out with sand, fine gravel or other media adapted for use in surfacing of walkways, drives, storage yards, and the like where it is desired to suppress all plant growth for a considerable period of time. To accomplish the dispersion of the toxicant under field conditions, either the use of a liquid carrier to accomplish the penetration of the soil or other growth medium, or the discing, dragging or mixing of the treated surface is desirable. Alternatively, rainfall, overhead sprinkling, or irrigation can operate to carry surface deposited toxicant down into the soil. It is recommended, however, that the treated surfaces not be disturbed below the depth of penetration or distribution of the toxicant, if complete suppression of vegetative growth is desired.

The new dust and spray compositions may be applied to the foliage of plants by conventional methods, e. g., with power dusters, boom and hand sprayers, and spray-dusters. In large scale operations, dust or low volume sprays may be applied from an aeroplane. This is particularly advantageous where the possibility of injury to crops from air-borne residues and drift is at a minimum.

The application of spray and dust compositions to plant foliage, suppresses the growth of a wide variety of broadleaf and narrowleaf plants such as the annual and perennial weeds and grasses commonly found around barnyards, and along highways, rights of way and irrigation ditch banks. Thus, it is possible to employ the present invention to effect a substantial denuding of the soil when desired.

The introduction of the toxicant, or spray or dust compositions containing the toxicant, into growth media may produce a transitory sterilizing action, the duration of which is dependent upon the amount of toxicant introduced therein and the conditions to which the growth media is exposed following treatment. The weathering action of sun and rain, and possibly the disassociation of the acetate compounds by the action of bacteria and other soil organisms eventually frees the growth media of the toxicant. Thus, growth media which has been retarded in accordance with the present invention may be entirely unadapted to support plant growth for a period of from several weeks to several months, or longer, and thereafter become adapted to be planted in conventional fashion to obtain normal plant growth.

The exact concentration of the acetate toxicant employed in compositions for treatment of either growth media or growing vegetation is not critical, provided that a minimum effective dosage is supplied either in the growth media or on the plant surfaces. This dosage of toxicant is primarily dependent upon the susceptibility of the vegetation to be controlled. In foliage treatments, for the control of broadleaf weeds, good results are obtained when from 1.0 to 15 pounds of toxicant is applied per acre. From 2 to 50 pounds per acre of toxicant is generally required for the control of grasses, although larger amounts up to 200 pounds per acre may be employed. In applications to soil for the control of the growth of germinative and germinant seeds, good results are obtained when the toxicant is distributed at a rate of at least 1.0 pound per acre. In such applications, it is desirable that the compound be distributed to a depth of at least 0.25 inch and preferably at a dosage of at least 1.0 pound per acre inch. The dosage of toxicant to be supplied growth medium compositions which are sterile to plant growth is from 25 to 250 parts per million parts by weight of growth medium, although somewhat larger proportions may be employed when economically practical. This proportion of 25 to 250 parts per million corresponds to an amount of toxicant of from 24 to 240 pounds per acre when distributed through the top three inches of soil or other growth media. Similarly, this range is equivalent to 96 to 960 pounds per acre foot (dispersed in an acre to the depth of one foot). These dosages may be supplied per acre in from 20 to 200 gallons or more of water or other liquid carrier, or in from 50 to 300 pounds of solid carrier.

The concentration of toxicant in spray composition employed to supply the desired dosage either in growth media or on the plant surfaces is from 0.06 to 50 percent by weight or higher in water or other liquid carrier. In dusts, the concentration of the toxicant may be from 1 to 95 percent by weight.

The following examples illustrate the invention but are not to be construed as limiting the same.

EXAMPLE 1

33 parts by weight of 2-(4-chloro-o-toloxy)-ethyl trichloroacetate, 7 parts of an emulsifying agent identified as an alkylphenol-alkylene oxide condensation product and 70 parts of toluene were mechanically mixed together to produce a concentrate composition in the form of an emulsifiable liquid. The latter composition was dispersed in water to prepare aqueous emulsion spray compositions containing various amounts of toxicant per 100 gallons of spray mixture. The spray mixtures were employed for the control of the broadleaf weeds, bur clover, lettuce, mustard and redweed, and the grasses, common rye and canary grass. In such operations, the spray mixtures were applied to the foliage of stands of each of the above enumerated plants at a dosage of 200 gallons per acre. The applications were made with conventional spray equipment at a pressure of 10 pounds per square inch. Each treatment was replicated five times. Eighteen days after the treatments, the plots were examined to ascertain the control of growth that had been obtained, and the following situation expressed in percent control was found to exist.

| Pounds of toxicant per acre | Percent control | | | | | |
|---|---|---|---|---|---|---|
| | Bur clover | Lettuce | Mustard | Redweed | Common rye grass | Canary grass |
| 1.95 | 100 | 100 | 100 | 100 | 62 | 62 |
| 9.75 | 100 | 100 | 100 | 100 | 87 | 87 |
| 48.75 | 100 | 100 | 100 | 100 | 100 | 100 |

Check areas containing the above enumerated plants were heavily overgrown with the test plant species.

EXAMPLE 2

In a similar manner, emulsifiable concentrate compositions were prepared having the following parts by weight of ingredient.

*Composition A*

| | |
|---|---|
| 1-(2,4-dichlorophenoxy)-2-propyl trichloroacetate | 35.4 |
| Alkylphenol-alkylene oxide condensation product | 6.6 |
| Toluene | 58.0 |

Composition B

| | |
|---|---|
| 2-(2,4,5-trichlorophenoxy)-ethyl trichloroacetate | 35.4 |
| Alkylphenol-alkylene oxide condensation product | 6.6 |
| Toluene | 58.0 |

Compositions A and B were separately dispersed in water to prepare aqueous emulsion spray compositions containing various amounts of toxicant per 100 gallon of spray mixture. The spray mixtures were employed as described in Example 1 for the control of various weeds and grasses. Eighteen days following the treatments, the plots were examined and the following situation was found to exist:

| Toxicant | Pounds of toxicant per acre | Percent control ||||||
|---|---|---|---|---|---|---|---|
| | | Bur clover | Lettuce | Mustard | Redweed | Common rye grass | Canary grass |
| 1-(2,4-dichloro-phenoxy)-2-propyl trichloroacetate | 11.2 | 100 | 100 | 100 | 100 | 75 | 75 |
| | 56.25 | 100 | 100 | 100 | 100 | 100 | 100 |
| 2-(2,4,5-trichlorophenoxy)-ethyl trichloroacetate | 2.36 | 87 | 100 | 100 | 87 | 25 | 25 |
| | 11.8 | 100 | 100 | 100 | 100 | 62 | 62 |
| | 59.0 | 100 | 100 | 100 | 100 | 87 | 87 |

Check areas containing each of the employed weeds and grasses were heavily overgrown with the test plants.

EXAMPLE 3

20 parts by weight of 2-(2,4,5-trichlorophenoxy)-ethyl trichloroacetate, 8 parts of an alkylphenol-alkylene oxide condensation product and 72 parts of toluene were mechanically mixed together to produce an emulsifiable concentrate composition. This composition was dispersed in water to prepare aqueous emulsions spray composition containing various amounts of toxicant per 100 gallons of spray mixture. These spray mixtures were employed for the treatment of Hanford sandy loam soil and Yolo loam soil which supported a very sparse stand of Bermuda grass. The sprays were applied to the soil surface at a dosage of 200 gallons per acre with conventional spray rig at a pressure of 10 pounds per square inch. From time of treatment to time of observation, about 7 months elapsed with 15 inches of water as rainfall or overhead sprinkling being applied during this period. The water operated to disperse the toxicant through the top layer of the soil. Three weeks before the observations, the first inch of soil surface was loosened in both treated and untreated check areas and thereafter sown with germinative seeds of pigweed, lamb's quarters, mustard, canary grass, rye grass and water grass. Upon examination of the plots to ascertain the degree of control of the Bermuda grass and the recited species of broadleaf vegetation and annual grasses that had been obtained, the following situation was found to exist:

| Pounds of toxicant per acre | Soil type | Percent control |||
|---|---|---|---|---|
| | | Bermuda grass | Broadleaf weeds | Annual grasses |
| 118 | Hanford sandy loam | 100 | 100 | 77 |
| 236 | do | 100 | 100 | 97 |
| 118 | Yolo loam | 100 | 100 | 99 |
| 236 | do | 100 | 100 | 90 |

At the time of observation, all live annual grass plants were found to be severely stunted. Check areas sowed with the recited species of broadleaf and gramineous weeds grew to a dense tangle of vegetation.

EXAMPLE 4

Seventeen parts by weight of 2-(2,4,5-trichlorophenoxy)ethyl trichloroacetate was mechanically mixed and ground with 83 parts by weight of attapulgite clay to obtain a concentrate dust composition in which the toxicant was dispersed in and on the particles of the clay carrier. This concentrate composition was mixed with moist sandy loam soil of good nutrient content to obtain growth medium compositions containing 25, 125 and 250 parts by weight of toxicant intimately dispersed with each million parts by weight of soil. These soil compositions were then spread as small plots three inches in depth and planted with germinative seeds of bur clover, canary grass, lettuce, mustard, redweed and rye. These plantings and untreated check planting were thereafter exposed to conventional greenhouse conditions of temperature, humidity and light. The seed plots were subjected daily to overhead watering in an amount corresponding to 4 inches of rainfall per month. After 30 days, each plot was examined and data taken of the amount and type of growth in relation to the indicated check plots. Thirty-five days after treatment, the soil in the plots was thoroughly mixed and reseeded. This five week cycle of replanting was repeated a number of times to determine the residual sterilizing activity of the 2-(2,4,5-trichlorophenoxy)ethyl trichloroacetate.

The toxicant dosages of 25, 125 and 250 parts per million in this controlled determination corresponds to 24, 120 and 240 pounds of 2-(2,4,5-trichlorophenoxy)-ethyl trichloroacetate per acre dispersed to a three inch depth. In the seedings the bur clover, lettuce, mustard and redweed were representative of broadleaf weeds. Canary grass and rye were representative of the grasses.

The following table sets forth the results obtained with the several treatments in original and repetitive plantings against broadleaf weeds and grasses:

| Pounds of toxicant per acre | Total number of times planted | Observation on 30 days' growth ||||||
|---|---|---|---|---|---|---|---|
| | | First planting || Next to last planting || Last planting ||
| | | Broadleaf weeds | Grasses | Broadleaf weeds | Grasses | Broadleaf weeds | Grasses |
| 24 | 6 | No germination | No germination | No germination | Poor germination with plants slightly stunted. | No germination | Poor germination with plants slightly stunted. |
| 120 | 7 | do | do | do | Poor germination with plants moderately stunted. | do | Normal germination and growth. |
| 240 | 8 | do | do | do | No germination | do | Do. |

Germination of all seeds and total growth of the resulting plants was good in untreated check plots reseeded at the time of each planting as reported above.

EXAMPLE 5

Seventeen parts by weight of each of 2-(4-chloro-o-toloxy)ethyl trichloroacetate and 2-(2,4-dichlorophenoxy)ethyl trichloroacetate were each separately mixed and ground with 83 parts by weight of attapulgite clay to obtain wettable powder compositions in which the toxicant was dispersed in and on the particles of the carrier. These compositions were separately mixed with moist sandy loam soil of good nutrient content to obtain compositions containing various amounts of toxicant per acre intimately dispersed with the soil to a three inch depth. The resulting soil compositions were employed as seed plots in exactly the manner as described in Example 4. The same growth intervals and replanting practices were observed as in the previous example. The following table summarizes the results obtained:

| Trichloroacetate toxicant | Pounds of toxicant per acre | Total number of times planted | Observation on 30 days' growth ||||||
|---|---|---|---|---|---|---|---|---|
| | | | First planting || Next to last planting || Last planting ||
| | | | Broadleaf weeds | Grasses | Broadleaf weeds | Grasses | Broadleaf weeds | Grasses |
| 2-(2,4-dichlorophenoxy)-ethyl. | 120 | 3 | No germination. | No germination. | Poor germination with plants moderately stunted. | No germination. | Normal germination and growth. | Normal germination and growth. |
|  | 240 | 3 | ____do____ | ____do____ | No germination | ____do____ | ____do____ | Do. |
| 2-(4-chloro-o-toloxy)-ethyl. | 192 | 3 | ____do____ | ____do____ | ____do____ | ____do____ | Poor germination, normal growth. | Do. |

Germination of all seeds and total growth of the resulting plants was good in untreated check plots reseeded at the time of each planting as reported above.

EXAMPLE 6

Moist sandy loam soil of good nutrient content was spread as small plots three inches in depth and planted with germinative seeds of bur clover, canary grass, lettuce, mustard, redweed and rye. Twenty-four hours after the planting, an acetate solution containing 17 percent by weight of 2-(2,4-dichlorophenoxy)isopropyl trichloroacetate was applied to the seeded soil at dosages of 120 and 240 pounds of toxicant per acre. The planted plots were then employed as described in Example 4. The same growth intervals and replanting practices being observed as in the previous example. The following table sets forth the results obtained:

| Pounds of toxicant per acre | Total number of times planted | Observation on 30 days' growth ||||
|---|---|---|---|---|---|
| | | Next to last planting || Last planting ||
| | | Broadleaf weeds | Grasses | Broadleaf weeds | Grasses |
| 120 | 3 | No germination. | Poor germination with moderately stunted plants. | Poor germination with severely stunted plants. | Poor germination, normal growth. |
| 240 | 4 | ____do____ | Poor germination with slightly stunted plants. | Poor germination with slightly stunted plants. | Normal germination and growth. |

Germination of all seeds and total growth of the resulting plants was good in untreated check plots reseeded at the time of each planting.

EXAMPLE 7

"Composition B" as set forth in Example 2, was dispersed in water to prepare an aqueous emulsion spray composition containing 59 pounds of 2-(2,4,5-trichlorophenoxy)ethyl trichloroacetate per 100 gallons of spray mixture. This spray composition was employed for the treatment of soil in an industrial area which supported a sparse, mixed stand of mature Bermuda and annual grasses. The spray was applied to the area at a dosage of 200 gallons per acre with conventional spray rig at a pressure of 50 pounds per square inch. From the time of treatment to the time of observation, 5 months elapsed with about 10 inches of rainfall. The rainfall operated to disperse the toxicant through the top layer of soil. The treatment was replicated twice. Upon examination of the plots, there was found a 95 percent control of Bermuda grass and a 100 percent control of annual grass. Check areas were found to contain a sparse stand of the grass plant species.

EXAMPLE 8

50 parts by weight of 2-(2,4,5-trichlorophenoxy)ethyl trichloroacetate, 47 parts of attapulgite, 2 parts of a partially desulfonated sodium ligonsulfonate (Marasperce CB) and 1 part of an octylphenol ethylene oxide condensation product (Triton X–100), were mechanically mixed and ground together to prepare a concentrate composition in the form of a wettable powder. This composition was dispersed in water to produce an aqueous spray composition containing 78.7 pounds of toxicant per 100 gallons of spray mixture.

In a further operation, 17 parts by weight of other acetate toxicants were separately dissolved in 83 parts of acetone and the resulting solution together with 120 grams of Triton X–100 separately dispersed in water to prepare spray compositions containing different amounts of toxicant per 100 gallons of spray mixture. These spray mixtures were employed for the control of mature stands of densely matted Bermuda grass. In these operations, the spray mixtures were applied to the foliage of the grass at a dosage of 300 gallons per acre with conventional spray equipment at a pressure of 10 pounds per square inch. Each treatment was replicated twenty times. The grass plots were thereafter subjected to overhead watering in an amount corresponding to about 2 inches of rainfall per month. Seven months following the treatments, the plots were examined to ascertain the presence or absence of live tissues of grass leaves, and roots and rhizomes. The presence of live tissue in each category was noted as either zero or 100 percent for each replicate and the average for the replicates for each category determined. The results are summarized in the following table:

| Trichloroacetate toxicant | Pounds of toxicant per acre | Percent control ||
|---|---|---|---|
| | | Grass leaves | Roots and rhizomes |
| 2-(4-chloro-o-toloxy) ethyl | 195 | 100 | 95 |
| 2-(2,4-dichlorophenoxy)-isopropyl | 225 | 100 | 85 |
| 2-(2,4,5-trichlorophenoxy)ethyl | 236 | 100 | 100 |

EXAMPLE 9

34.6 parts by weight of 2-(2,4-dichlorophenoxy) ethyl trichloroacetate, 7 parts of an emulsifying agent identified as an alkylphenol-alkylene oxide condensation product and 58.4 parts of toluene were mechanically mixed together to produce an emulsifiable concentrate composition. This composition and "Composition B" of Example 2 were separately dispersed in water to prepare aqueous emulsion spray compositions containing various amounts of toxicant per 100 gallons of spray mixture. These spray compositions were employed for the control of the growth of germinative seeds of various grasses and broadleaf plants. In such operations, the sprays were applied to the surface of the soil, twenty-four hours after the soil had been planted with the test plant species. The applications were made at a dosage of 200 gallons per acre and a pressure of 10 pounds per square inch. Each treatment was replicated twice. The seeded areas were subjected to daily overhead watering in an amount corresponding to about 3 inches of rainfall per month.

Twenty-six days after the applications, the plots were examined and the following situation was found to exist:

| Acetate toxicant | Pounds of toxicant per acre | Percent control of germination | | | | | |
|---|---|---|---|---|---|---|---|
| | | Canary grass | Water grass | Radish | Bur clover | Lamb's quarters | Pigweed |
| 2-(2,4-dichlorophenoxy) ethyl | 1.08 | 96.5 | 90 | 100 | 99.5 | 100 | 100 |
| | 2.17 | 99 | 98.5 | 100 | 99.5 | 100 | 100 |
| | 4.34 | 100 | 98.5 | 100 | 100 | 100 | 100 |
| 2-(2,4,5-trichlorophenoxy) ethyl | 1.18 | 70 | 62.5 | 100 | 89 | 99.5 | 100 |
| | 2.36 | 90 | 80 | 100 | 86 | 99 | 100 |
| | 4.72 | 92.5 | 82.5 | 100 | 89.5 | 99 | 97.5 |

Check areas were found to contain vigorously growing and dense stands of the test plant species.

EXAMPLE 10

Finely divided 2-(2,4,5-trichlorophenoxy)ethyl trichloroacetate and finely divided bentonite are mechanically mixed and ground together to prepare a wettable powder concentrate composition containing 90 percent by weight of the acetate compound. The latter composition is thereafter dispersed in additional finely divided bentonite to produce a dust composition containing 25 pounds of toxicant per 100 pounds of dust mixture. This mixture is applied at a dosage of 400 pounds per acre to recently worked and dragged soil and sand of the shoulders in and adjacent to the intersection of several secondary highways. The treated surface is then disced to accomplish distribution of the toxicant and thereafter rolled. Control of vegetation is complete for the entire growing season with exception of a few growing and badly stunted grasses. Particularly effective control is obtained of high growing succulent broadleaf weeds.

The trichloroacetates of the chloroaryloxy alkanols employed in accordance with the teachings of the present invention are crystalline solids or oily liquids, somewhat soluble in many organic solvents and substantially insoluble in water. The compounds may be prepared by reacting together a molecular proposition of (1) trichloroacetic acid and (2) at least a molecular proportion of a haloaryloxy alkanol such as 4-chlorophenoxy ethanol, 4-chlorophenoxy propanol, 2-chlorophenoxy ethanol, 4-chloro-o-toloxy ethanol, 4-chloro-o-toloxy propanol, 2,4-dichlorophenoxy ethanol, 2,4-dichlorophenoxy propanol and 2,4,5-trichlorophenoxy ethanol. The reaction may be carried out in the presence of an esterification catalyst such as sulphuric acid. In such preparation, the reactants and catalyst, if employed, are mixed together in a water-immiscible solvent such as ethylene dichloride and the resulting mixture heated for about 3 hours or longer at a temperature of from 85 to 160° C. Better yields are obtained when the water of reaction is removed as formed. Upon completion of the reaction, the mixture is neutralized with an alkali such as dilute aqueous sodium carbonate. The resulting mixture divides into aqueous and solvent layers. The solvent layer, which contains the ester reaction product, is separated and washed several times with water to extract the water soluble salts of catalyst and unreacted trichloroacetic acid. The solvent is then removed by distillation under reduced pressure to obtain the desired ester compound. These trichloroacetate compounds are claimed per se and a method for their preparation disclosed in the application of Louis E. Begin, Serial No. 257,935, filed November 23, 1951.

I claim:

1. A concentrate composition for the suppression of the growth of vegetation comprising as an active toxic ingredient a trichloroacetate of a chloroaryloxy alkanol, having the formula $$CCl_3\overset{O}{\underset{\|}{C}}-O-C_nH_{2n}-O-R$$

wherein $n$ represents one of the integers 2 and 3 and R represents a chloroaryl radical, in admixture with at least one material selected from the group consisting of finely divided inert solids and surface active dispersing agents, the active ingredient being present in the amount of from 5 to 95 percent by weight.

2. A concentrate composition as claimed in claim 1, wherein the active ingredient is admixed with a surface active dispersing agent.

3. A spray mixture for the suppression of the growth of vegetation comprising an aqueous dispersion of the composition claimed in claim 2, the active ingredient in such spray mixture being present in the amount of at least 0.06 percent by weight.

4. A concentrate composition for the suppression of the growth of vegetation which comprises as an active toxic ingredient 2-(2,4,5-trichlorophenoxy)ethyl trichloroacetate, in admixture with a surface active dispersing agent, the active ingredient being present in the amount of from 5 to 95 percent by weight.

5. A concentrate composition for the suppression of the growth of vegetation which comprises as an active toxic ingredient 2-(4-chloro-o-toloxy)ethyl trichloroacetate, in admixture with a surface active dispersing agent, the active ingredient being present in the amount of from 5 to 95 percent by weight.

6. A concentrate composition for the suppression of the growth of vegetation which comprises as an active toxic ingredient 1-(2,4-dichlorophenoxy)-2-propyl trichloroacetate, in admixture with a surface active dispersing agent, the active ingredient being present in the amount of from 5 to 95 percent by weight.

7. A composition of matter sterile to plant growth which comprises a growth inhibiting concentration of a trichloroacetate of a chloroaryloxy alkanol having the formula $$CCl_3\overset{O}{\underset{\|}{C}}-O-C_nH_{2n}-O-R$$

wherein $n$ represents one of the integers 2 and 3 and R represents a chloroaryl radical, in admixture with a growth medium.

8. A composition as claimed in claim 7, wherein the trichloroacetate ester is present in the amount of from 25 to 250 million parts by weight.

9. A composition as claimed in claim 8, wherein the acetate ester is 2-(2,4,5-trichlorophenoxy)ethyl trichloroacetate.

10. A method for sterilizing a growth medium which comprises the step of intimately dispersing therein at least 25 parts per million by weight of a trichloroacetate of a chloroaryloxy alkanol, having the formula $$CCl_3\overset{O}{\underset{\|}{C}}-O-C_nH_{2n}-O-R$$

wherein $n$ represents one of the integers 2 and 3 and R represents a chloroaryl radical.

11. A method for sterilizing soil which comprises spreading over the surface and working into the top 3 inches of soil from 24 to 240 pounds per acre of a trichloroacetate of a chloroaryloxy alkanol, having the formula

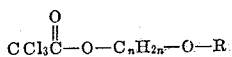

wherein $n$ represents one of the integers 2 and 3 and R represents a chloroaryl radical.

12. A method for the control of vegetation which comprises contacting the foliage of such vegetation with a growth inhibiting amount of a trichloroacetate of a chloroaryloxy alkanol having the formula

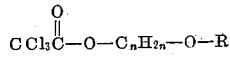

wherein $n$ represents one of the integers 2 and 3 and R represents a chloroaryl radical.

13. A method for the suppression of the growth of germinative and germinant seeds in soil which comprises the step of distributing therein at the rate of at least 1.0 pound per acre, a trichloroacetate of a chloroaryloxy alkanol having the formula

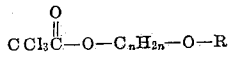

wherein $n$ represents one of the integers 2 and 3 and R represents a chloroaryl radical.

References Cited in the file of this patent

UNITED STATES PATENTS

| Number | Name | Date |
| --- | --- | --- |
| 2,393,086 | Bousquet | Jan. 15, 1946 |
| 2,550,049 | Eaker | Apr. 24, 1951 |
| 2,573,769 | Lambrech | Nov. 6, 1951 |
| 2,581,852 | Gilbert | Jan. 8, 1952 |

OTHER REFERENCES

Botanical Gazette, volume 107 (1946), pages 475 to 507.